Sept. 8, 1959 J. D. BASKIN 2,902,990
MEANS FOR PROTECTING CROPS FROM FROST AND COLD
Filed May 20, 1957 2 Sheets-Sheet 1
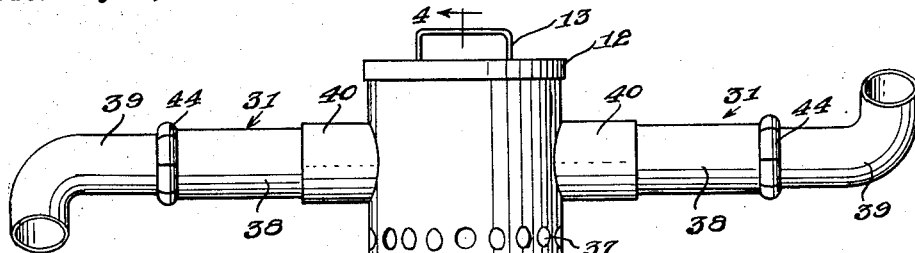
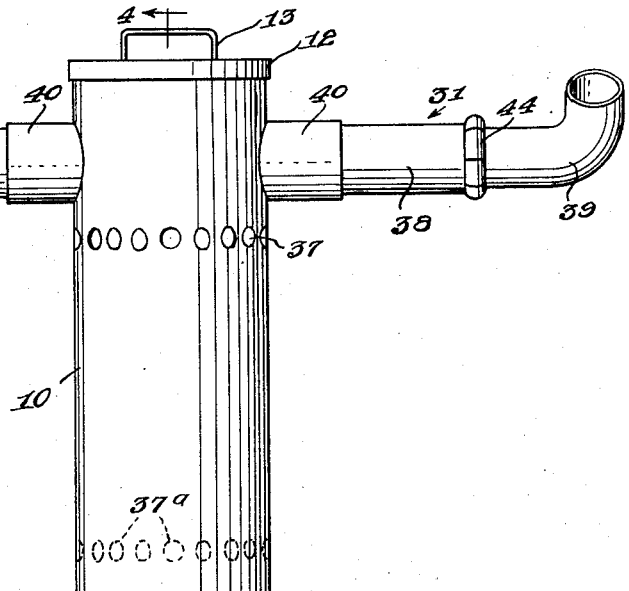
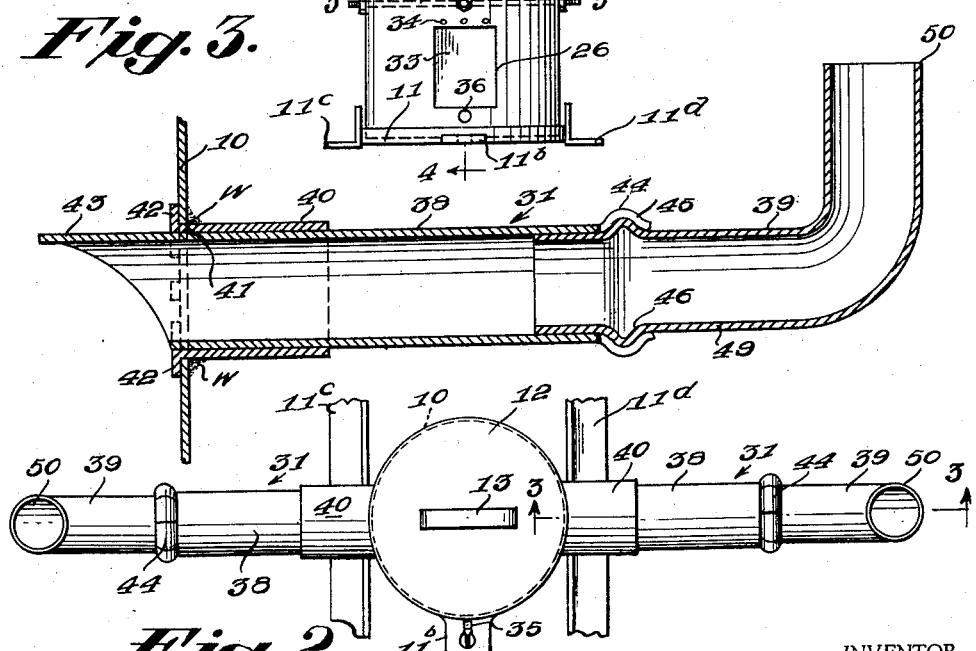
INVENTOR
Jeff D. Baskin.
BY 
ATTORNEY Sept. 8, 1959            J. D. BASKIN            2,902,990
MEANS FOR PROTECTING CROPS FROM FROST AND COLD
Filed May 20, 1957            2 Sheets-Sheet 2
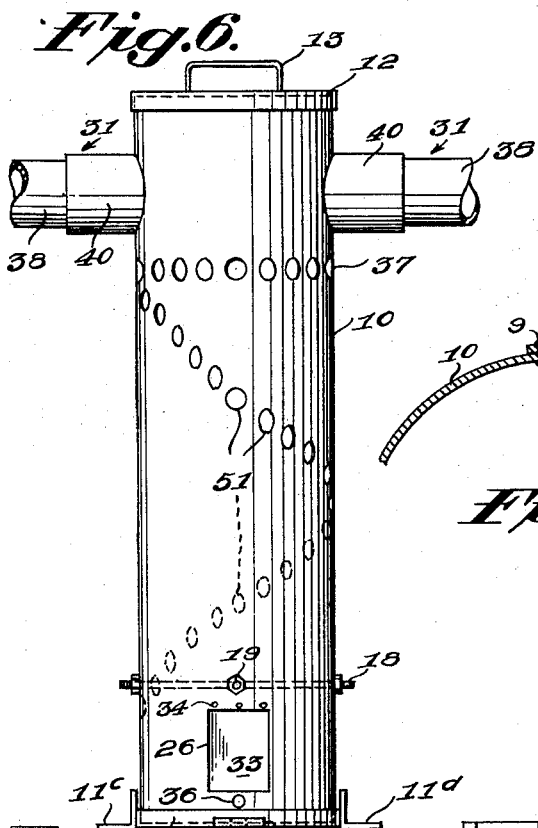
INVENTOR
Jeff D. Baskin.
BY Herbert M. Birch
ATTORNEY United States Patent Office 2,902,990
Patented Sept. 8, 1959

2,902,990
MEANS FOR PROTECTING CROPS FROM FROST AND COLD

Jeff D. Baskin, Clearwater, Fla.

Application May 20, 1957, Serial No. 660,356

2 Claims. (Cl. 126—59.5)

My present invention relates to a pure smoke producing device in the nature of a smudge pot or orchard heater.

It is an object of my invention to provide a unit adapted to be used to generate a dense protective smoke without the use of smudge oils or the like, which oils form a toxic coating on the plant foliage, which when washed off by rain penetrates into the ground to be picked up by the plant roots often causing decline trouble in the plant life causing malformed fruit and vegetables and may even kill the plant itself.

Another object is to provide a light weight metal smoke generator for protecting either high growing fruit produce or for protecting low growing vegetable produce from unexpected frost and cold.

A further object is to provide in combination with the main combustion chamber, smoke directing and distributing means, which communicate with the combustion chamber and some of which means are adjustable for directing and distributing the smoke to the most effective locations for a maximum protective smoke blanketing of the crops.

A further object is to provide a knockdown or semi-knockdown orchard heater or the like supported on runners and adapted to be pre-loaded with fuel and left in the orchard or crop field partially knocked down and ready for use when needed, and which is also adapted to drain off any excess moisture or water which may collect therein prior the use thereof.

A further object is to provide an orchard heater or the like which is readily adapted to mass production, to thereby permit manufacture and sale thereof at a lower price than is possible heretofore with prior art smudge pots or heaters.

Still another object is to provide in a heater, means for protecting high or low growing crops, including interchangeable and adjustable smoke directing conduits and attachments therefor.

A further object of the invention is the provision of an improved smudge pot, which includes a relatively high cylindrical combustion chamber and wherein the wall of such chamber is provided with improved air control means for maximum combustion efficiency, and fog or smudge production.

Other objects and advantages of the invention will become apparent in the course of the following detailed description, taken in connection with the accompanying drawings, wherein:

Fig. 1 is a side elevational view of the improved smudge pot in accordance with a preferred structural embodiment thereof.

Fig. 2 is a top plan view of the smudge pot showing the nozzles directed vertically.

Fig. 3 is an enlarged vertical sectional view as observed in the plane of line 3—3 on Fig. 2.

Fig. 4 is a vertical sectional view as observed in the plane of line 4—4 on Fig. 1.

Fig. 5 is an enlarged horizontal sectional view as observed in the plane of line 5—5 on Fig. 1.

Fig. 6 is a broken elevational view corresponding to Fig. 1 of a slightly modified embodiment of the invention.

Fig. 7 is an enlarged vertical sectional view of a modified embodiment of one of the nozzles embodied in the invention.

Fig. 8 is a fragmental horizontal sectional view showing a vertical seam in the fuel burning housing upon construction of same from a single sheet of material.

Referring now in detail to the drawings, and first to Figs. 1 to 5 thereof, the improved protective smoke producer or generator will be seen to comprise, a cylindrical fuel burning housing or combustion chamber 10, which is elongated to be of substantial height and of suitable diameter. The housing is preferably formed from relatively light gauge sheet metal with a side lock seam 8 secured by fasteners, such as bolts or rivets 9 to withstand high heat, and is thereby light in weight and easy to move to various locations of use. The burner housing 10 is open at both ends and in use, the bottom open end is closed by a marginally flanged base plate 11 with a drain opening 11a in which the lower end of the housing is freely seated. Also the plate 11 is formed with a perforated ear 11b. The top open end of the housing is closely by a removable cover 12, which is provided with a hand engageable handle 13. The handle 13 may be of heat insulated material.

The housing 10 is provided with a fuel supporting means, such as a grate 14 adjacent the lower end thereof, but which is spaced a substantial vertical distance above the lower end of the housing.

As is more clearly shown in Fig. 5, the plate or grate 14 comprises a circular member, such as a plate 15. The plate 15 is formed with a plurality of spaced openings 16. The grate, however, is not limited to the disclosed specific construction, but in any eventuality it is circular for conformity with the cylindrical wall of housing 10.

The circular fuel plate or grate 15 is provided with a marginal flange 17, which rests on cross bars 18 and 19. These bars are threaded at each end and are secured by nuts 20 threaded thereon, see Figure 5. Also, the bar 19 may be slightly offset to centrally receive the thickness of the other bar 18, whereby the grate plate will rest evenly.

Smoke forming fuel, such as wood and wet sawdust, is adapted to be supported and burned on the grate 14 and the resulting crop protecting smoke is directed from the upper end of the housing by means of radially outwardly projecting conduits 31 or from lower smoke emitting means, later referred to in detail. Means are provided for the admission of air into the housing 10 to effect proper combustion of the fuel supported on the grate 14 or in the housing and for this purpose, a simple opening 26 with or without an adjustable vent may be provided in the housing wall beneath the grate 14.

One form of vent when made adjustable comprises a rectangular opening 26 in the wall portion below the grate plate support bars 18 and 19 and a relatively thin resiliently yieldable and flexible flap door 33 is disposed within the housing, which is of dimensions slightly greater than that of the opening 26. The flap door has its upper edge secured to the wall portion immediately above the top of opening 26 as by means of rivets 34 and the door normally assumes a flat position for normally closing the opening 26.

In order to open the door 33 to variable extents for the required regulation of combustion air, an elongated screw 35 is threaded through the wall portion and whose free end is engageable with the door 33 adjacent the lower free edge thereof, as is clearly indicated in Fig. 4. The said screw 35 is provided with a finger engageable manipulating head 36, whereby the door 33 may be adjusted by turning the screw 35 inwardly or outwardly. Furthermore, the wall of housing 10 is provided with a circumferential series of upper and lower smoke emitting apertures 37 and 37a below the smoke conducting conduits 31. The conduits 31 with the apertures 37 and 37a are an important feature of the invention and these conduits extend radially outwardly from the upper end of the housing 10 and as shown, a pair of such conduits have been found satisfactory, but a greater or less number may be employed.

The conduits 31 each comprise a tubular section 38 and an adjustable nozzle 39. The tubular section 38 is frictionally retained in a tubular sleeve 40, which extends through an aperture 41 in the wall of housing 10. This sleeve 40 is provided on the inner end thereof with a circumferential series of tabs 42 projecting radially outwardly and in engagement with the inner surface of the housing wall as is clearly indicated in Fig. 4. The sleeve 40 is rigidly retained in position, by means of welding W, as illustrated in Fig. 3. The tubular section 38 projects inwardly of the housing in the form of a combustion products deflector 43. Back pressure and smoke deflection is caused by the turning of the open ends 50 of the angularly adjustable elbow nozzles 39 downward toward the ground and by the respective smoke deflectors 43, whereby crop protective smoke emits from the apertures 37 and 37a, see Figures 1 and 4, or from the spirally arranged openings 51, see Figure 6.

The outer ends of the tubular sections 38 are provided with outwardly arched sections 44, which jointly provide yieldable circumferential seats 45 for frictional reception of circumferential beads 46 on the portions 49 of the elbow nozzles 39 to thereby permit the open end portions 50 of nozzles 39 to be turned or rotated up or down with respect to the ground. These nozzle portions 49 extend inwardly a substantial distance from the beads 46 to provide lateral rigidity of the combined sections 38 and nozzles 39. The nozzles 39 comprise in addition to the portions 49, portions 50 which are disposed in angular relation to the portions 49.

In accordance with the modified embodiment of the invention disclosed in Fig. 6, the housing 10 is provided with an additional series of smoke emitting apertures 51, which are disposed in spiral formation between the series of apertures 37 and the door opening 26. Since it is the function of the nozzles 39 to direct the fog or smoke toward the crop to be frost protected, they may include interchangeable or detachable outwardly diverging mouths 52, as in the modified embodiment of Fig. 7, whereby the products of combustion will be spread more rapidly and over larger areas.

From the above description it will be apparent that the improved smoke producer is well adapted for use to prevent frost injury to either high or low growing crops. The provision of the conduits 31, embodying the nozzles 39, which are rotatably adjustable around the axes of the fixed conduit sections 38 direct the smoke into the branches of the high growing crops and the openings 37 and 37a or 51 direct the smoke to the low growing crops. As is indicated in Fig. 1, the left hand conduit nozzle 39 is adjusted to a position wherein the terminal portion 50 is directed downwardly at for example an angle of 45 degrees to the horizontal, while the right hand nozzle 39 is adjusted to a position wherein the terminal portion 50 is directed upwardly at an angle of 45 degrees to the horizontal.

While the housing 10 is preferably constructed from a single sheet of material with a resulting seam 8, the same is otherwise shown as of unitary construction for simplicity in disclosure.

As indicated in Fig. 2, both nozzles 39 are adjusted, whereby the portions 50 are directed vertically upwardly.

Thus it will be apparent that the adjustable nozzles provide for directing the smoke on the crops to be protected and when using the same for low growing crops may be directed downwardly.

By the use of the nozzle shown in Fig. 7, the wide funnel-shaped mouths 52 provide for a more rapid and larger area of distribution of the smoke.

When a large orchard is to be protected by my novel smoke generator units, the units are placed at intervals of approximately 80 to 95 trees apart and are pre-loaded with fuel such as oak or pine logs and sawdust, and the conduits may be pulled off and placed inside the combustion chamber until the same are to be used.

The several units are loaded through the top and when the same are started and the conduits are put in position, they may be moved, if desired, by engaging a hook or the like in the eye of the ear 11$^b$ and the same may be pulled along the ground on the runners 11$^c$ and 11$^d$ to the position needed. The sawdust if moist will provide a dense smoke, which is emitted from the apertures 37, 37$^a$ and 51 as well as the conduits 31, and such smoke will rapidly spread and form a protective blanket over and around the crops.

Although only some of the embodiments of the invention have been illustrated and described in detail, it is to be expressly understood that the invention is not limited thereto. Various changes may be made in the design and arrangement and combination of parts without departing from the spirit and scope of the invention, as will now likely occur to others skilled in the art. For a definition of the limits of the invention, reference should be had to the appended claims.

What is claimed is:

1. Means for generating frost preventing smoke and for depositing a blanket thereof on low and high growing crops, comprising a vertically elongated cylindrical housing of uniform diameter throughout its vertical extent, a flanged base plate engaged with the lower end of said housing, a flanged removable cover engaged with the upper end of said housing, fuel supporting means disposed within said housing adjacent the lower end thereof, an air admission opening in the wall of said housing intermediate said base plate and said fuel supporting means, means for controlling admission of air through said opening, a pair of axially aligned smoke conducting conduits for depositing smoke on high growing crops extending radially outwardly from opposite sides of said housing and communicating with same closely beneath said cover said conduits being formed of tubular sections, one section being formed at its top perimeter with an inwardly projecting smoke deflector adapted to develop a back pressure, said deflector extending into the interior of said housing in the path of the smoke generated in said housing, another tubular section on the free end of each of said conduits comprising an adjustable elbow nozzle having an open end portion, said nozzle being manually turnable with the open end thereof up or down, and said housing wall being provided with a series of smoke emitting apertures disposed in widely vertically spaced zones intermediate said conduits and said fuel supporting means for depositing smoke on low growing crops disposed at different elevations between said conduits and said fuel supporting means, said smoke deflector and said respective elbow nozzles when turned down increasing the discharge of smoke from said smoke emitting apertures.

2. Means for generating frost preventing smoke and for depositing a blanket thereof on low and high growing crops as described in claim 1, wherein the said elbow nozzle open end portions each include interchangeable sections having outwardly diverging mouth portions.

References Cited in the file of this patent

UNITED STATES PATENTS 341,335    Kizziar _____ May 4, 1886

(Other references on following page)

UNITED STATES PATENTS

| | | |
|---|---|---|
| 1,024,633 | Johnson | Apr. 30, 1912 |
| 1,222,794 | Quinn | Apr. 17, 1917 |
| 1,447,029 | Manchester | Feb. 27, 1923 |
| 1,713,659 | Karr | May 21, 1929 |
| 1,741,304 | Jackes | Dec. 31, 1929 |
| 1,836,314 | Doran et al. | Dec. 15, 1931 |
| 1,849,207 | Scheu | Mar. 15, 1932 |
| 2,168,021 | Cranmer | Aug. 1, 1939 |
| 2,199,875 | Brogden | May 7, 1940 |
| 2,240,224 | Nance et al. | Apr. 29, 1941 |
| 2,323,916 | Katz | July 13, 1943 |
| 2,522,935 | Farrall | Sept. 19, 1950 |
| 2,571,741 | Mayer | Oct. 16, 1951 |
| 2,709,551 | Bower et al. | May 31, 1955 |